United States Patent
Rainisto

(10) Patent No.: US 10,430,040 B2
(45) Date of Patent: Oct. 1, 2019

(54) METHOD AND AN APPARATUS FOR PROVIDING A MULTITASKING VIEW

(71) Applicant: Microsoft Technology Licensing, LLC, Redmond, WA (US)

(72) Inventor: Roope Rainisto, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 700 days.

(21) Appl. No.: 14/997,996

(22) Filed: Jan. 18, 2016

(65) Prior Publication Data

US 2017/0205980 A1   Jul. 20, 2017

(51) Int. Cl.
| | | |
|---|---|---|
| *G06F 3/048* | (2013.01) | |
| *G06F 3/0484* | (2013.01) | |
| *G06F 3/0481* | (2013.01) | |
| *G06F 9/48* | (2006.01) | |
| *G06F 9/54* | (2006.01) | |
| *G06F 9/451* | (2018.01) | |

(52) U.S. Cl.
CPC .......... *G06F 3/0484* (2013.01); *G06F 3/0481* (2013.01); *G06F 9/4856* (2013.01); *G06F 9/543* (2013.01); *G06F 9/451* (2018.02)

(58) Field of Classification Search
CPC .... G06F 3/0484; G06F 3/0481; G06F 9/4856; G06F 9/543; G06F 9/451; G06F 9/4443
See application file for complete search history.

(56) References Cited

U.S. PATENT DOCUMENTS

| | | |
|---|---|---|
| 8,964,947 B1 | 2/2015 | Noolu et al. |
| 9,098,357 B2 | 8/2015 | Uola et al. |
| 9,959,018 B2 * | 5/2018 | Ryu .................. G06F 3/0484 |
| 2007/0016872 A1 | 1/2007 | Cummins et al. |
| 2009/0204966 A1 | 8/2009 | Johnson et al. |
| 2011/0112819 A1 * | 5/2011 | Shirai .................. G06F 9/452 703/21 |
| 2014/0359637 A1 | 12/2014 | Yan |
| 2015/0020013 A1 * | 1/2015 | Kim .................... G06F 3/0488 715/769 |
| 2015/0128042 A1 | 5/2015 | Churchill et al. |
| 2015/0350296 A1 * | 12/2015 | Yang .................. H04L 67/025 715/740 |

(Continued)

FOREIGN PATENT DOCUMENTS

WO   2015047433 A1   4/2015

OTHER PUBLICATIONS

"Use Continuity to Connect your iPhone, iPad, iPod Touch, and Mac", Published on: Nov. 13, 2015, 5 pages Available at: https://support.apple.com/en-in/HT204681.

(Continued)

*Primary Examiner* — Andrew T Chiusano

(57) ABSTRACT

According to an aspect, there is provided a method and an apparatus for providing a multitasking view. Task information of a task executed on a first device and a preview image of the executed task is received. The preview image comprises at least partly a task view on a display of the first device. A multitasking view is provided on a display of a second device, and the multitasking view comprises tasks currently executed by the second device as well as the preview image of the task executed by the first device. A user of the second device is then able to select the preview image to initiate a further action.

20 Claims, 12 Drawing Sheets

(56) References Cited

U.S. PATENT DOCUMENTS

2015/0350355 A1 12/2015 Linn et al.

OTHER PUBLICATIONS

Belfiore, Joe, "Your Windows 10 PC will Love all the Devices you own", Published on: May 26, 2015, 5 pages Available at: http://blogs.windows.com/windowsexperience/2015/05/26/your-windows-10-pc-will-love-all-the-devices-you-own/.

"An Ecosystem of Connected Devices", Retrieved on: Nov. 17, 2015, 9 pages Available at: https://www.safaribooksonline.com/library/view/designing-multi-device-experiences/9781449340391/ch01.html.

Clover, Juli, "Inside iOS 9: Split-Screen Multitasking for the iPad", Published on: Sep. 16, 2015, 9 pages Available at: http://www.macrumors.com/2015/09/16/ios-9-split-screen-multitasking-ipad/.

Chang, et al., "Deep Shot: A Framework for Migrating Tasks Across Devices Using Mobile Phone Cameras", In Proceedings of ACM CHI Conference on Human Factors in Computing Systems, May 7, 2011, 10 pages.

Kastrenakes, Jacob, "Samsung's Flow App lets you Transfer what you're doing across Devices", Published on: May 19, 2015, 2 pages Available at: http://www.theverge.com/2015/5/19/8624803/samsung-flow-released-move-apps-across-devices.

Jokela, et al., "Connecting Devices for Collaborative Interactions", In Journal of Interactions Magazine, vol. 22, Issue 4, Jul. 2015, pp. 39-43.

Cousins, et al., "Exploring Multi-Device Task Management with the Collaboration Annex", In Proceedings of Nineteenth Annual ACM Symposium on User Interface Software and Technology, Oct. 15, 2006, pp. 53-54.

"International Search Report and Written Opinion Issued in PCT Application No. PCT/US2017/013085", dated Apr. 10, 2017, 15 Pages.

* cited by examiner

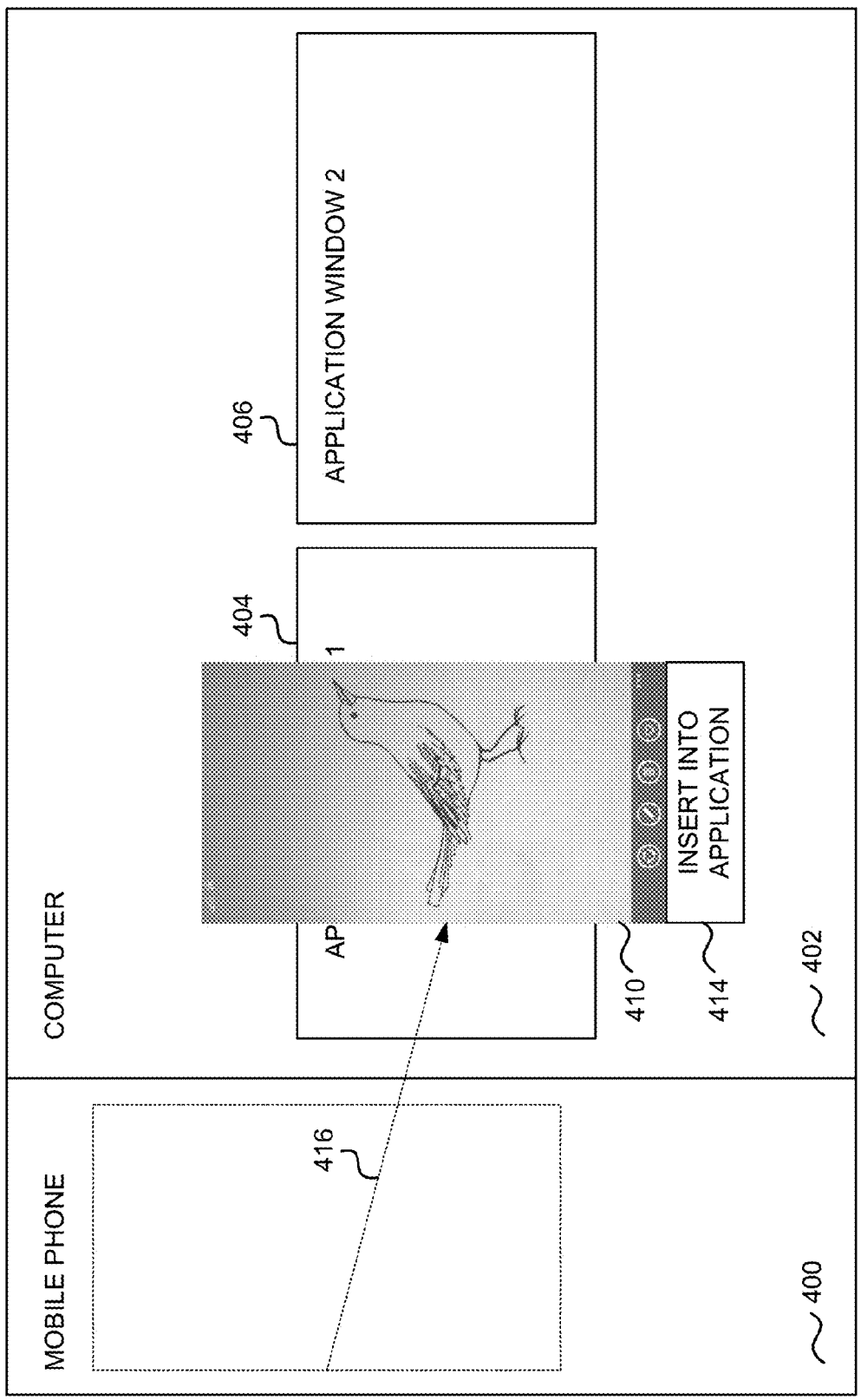

METHOD AND AN APPARATUS FOR PROVIDING A MULTITASKING VIEW

BACKGROUND

Many users nowadays have multiple devices that they interact with, for example, a phone, a tablet computer, a laptop computer etc. These devices may be used in different environments. It is not uncommon that a similar task can be done with several of these devices. In these cases it can happen that the user would like to move or continue doing the task with some other device.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, a method is provided. The method comprises receiving, by at least one processor, task information of a task executed on a first device and a preview image of the executed task, the preview image comprising at least partly a task view on a display of the first device, causing, by the at least one processor, display of a multitasking view on a display of a second device, the multitasking view comprising applications currently executed by the second device, causing, by the at least one processor, display of the preview image of the task executed by the first device in the multitasking view on the display of the second device, detecting, by the at least one processor, movement of the preview image on a task in the multitasking view executed by the second device, determining, by the at least one processor, an action to be executed based on the received task information and the task executed by the second device, and executing, by the at least one processor, the action.

In another embodiment, an apparatus is provided. The apparatus comprises at least one processing unit and at least one memory. The at least one memory stores program instructions that, when executed by the at least one processing unit, cause the apparatus to receive task information of a task executed on a first device and a preview image relating to the executed task, the preview image comprising at least partly an application view on a display of the first device, cause display of a multitasking view on a display of a second device, the multitasking view comprising tasks currently executed by the second device, cause display of the preview image of the task executed by the first device in the multitasking view on the display of the second device, and enable selection of the preview image to initiate a further action.

In another embodiment, an apparatus is provided. The apparatus comprises at least one processing unit and at least one memory. The at least one memory stores program instructions that, when executed by the at least one processing unit, cause the apparatus to receive task information of a task executed by a first device and a preview image relating to the task, the preview image comprising at least partly a task view on a display of the first device, cause display of a multitasking view on a display of a second device, the multitasking view comprising tasks currently executed by the second device, cause display of the preview image of the task executed by the first device in the multitasking view on the display of the second device, detect movement of the preview image on a task in the multitasking view executed by the second device, and copy content from the task executed by the first device into the task executed by the second device.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein:

FIG. 4B illustrates another multitasking view provided by the second device.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples. Furthermore, as used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

Various embodiments described below provide a solution in which a task started with a first device may be continued with a second device. The second device provides a multitasking view comprising tasks currently executed by the second device. The multitasking view comprises also the preview image of the task executed by the first device in the multitasking view on the display of the second device. The preview comprises at least partly a task view on a display of the first device. The preview may comprise a thumbnail of an application window on the display of the first device. A user of the second device may also perform an action linking the preview image to a task in the multitasking view executed by the second device. Depending on the task executed by the first device and the task executed by the second device, various actions may be provided by the second device. At least some of the embodiments provide an enhanced user interface experience since the thumbnails look like actual views provided by the one or more first devices, and an increased user interaction performance is provided since the preview image provided in the multitasking view results in more efficient user interaction. Further, at least some of the embodiments provide a solution where the user is able to see from the multitasking view how the task is going to be continued with the application executed by the second device. Further, at least some of the embodiments provide a solution where the user may be given multiple alternatives how the task is going to be continued with the application executed by the second device. Further, at least some of the embodiments provide a solution where the user may be given a list of applications from which to choose an application with which to continue the task started with the first device.

Figure 1:
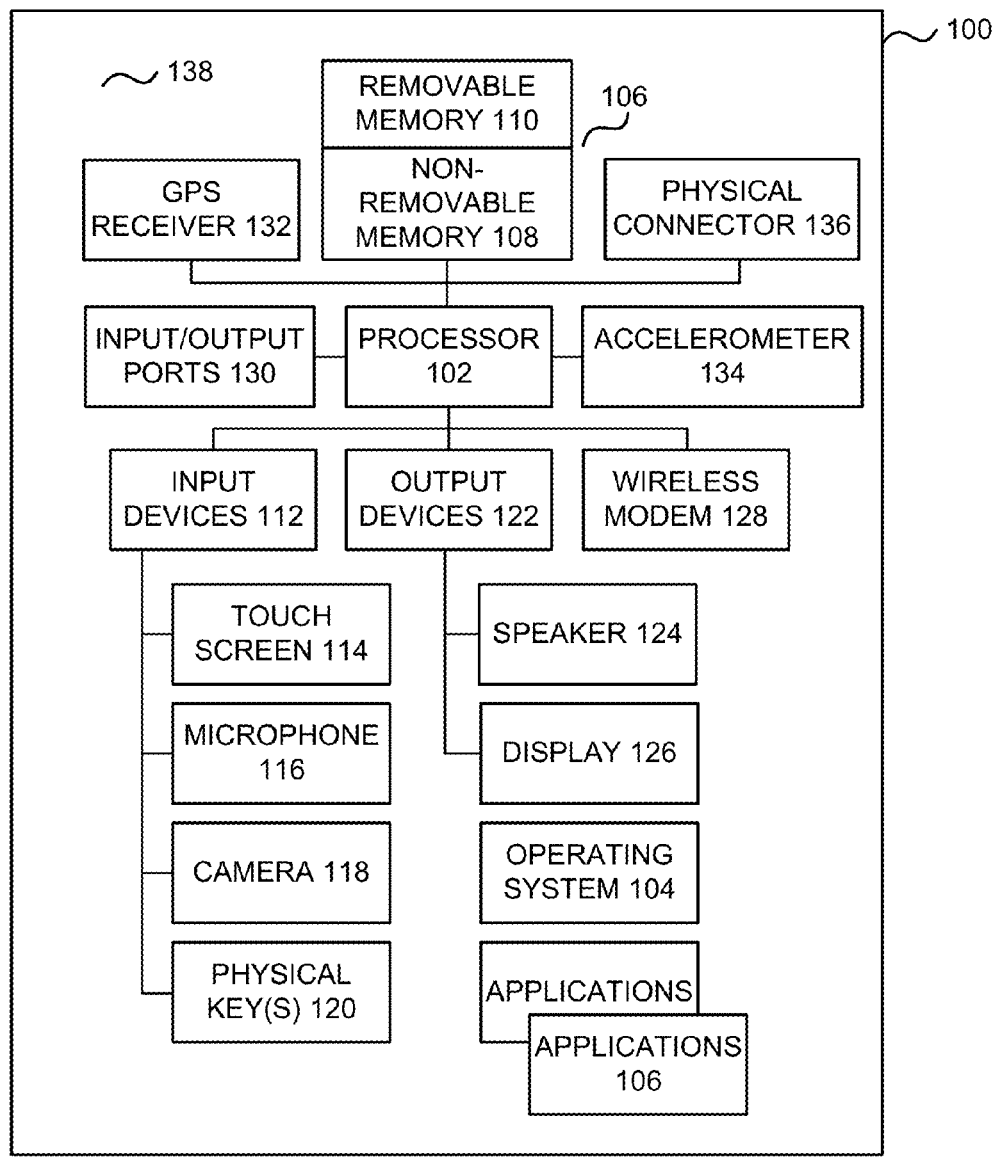
FIG. 1 is a system diagram depicting an apparatus including a variety of optional hardware and software components.

FIG. 1 is a system diagram depicting an apparatus 100 including a variety of optional hardware and software components, shown generally at 138. Any components 138 in the apparatus can communicate with any other component, although not all connections are shown, for ease of illustration. The apparatus can be any of a variety of computing devices (for example, a cell phone, a smartphone, a handheld computer, a tablet computer, a Personal Digital Assistant (PDA), etc.) and can allow wireless two-way communications with one or more communications networks, such as a cellular or satellite network.

The illustrated apparatus 100 can include a controller or processor 102 (e.g., signal processor, microprocessor, ASIC, or other control and processing logic circuitry) for performing such tasks as signal coding, data processing, input/output processing, power control, and/or other functions. An operating system 104 can control the allocation and usage of the components 138 and support for one or more application programs 106. The application programs can include common computing applications (e.g., email applications, calendars, contact managers, web browsers, messaging applications), or any other computing application.

The illustrated apparatus 100 can include a memory 109. The memory 109 can include non-removable memory 108 and/or removable memory 110. The non-removable memory 108 can include RAM, ROM, flash memory, a hard disk, or other well-known memory storage technologies. The removable memory 110 can include flash memory or a Subscriber Identity Module (SIM) card, which is well known in GSM communication systems, or other well-known memory storage technologies, such as "smart cards." The memory 109 can be used for storing data and/or code for running the operating system 104 and the applications 106. Example data can include web pages, text, images, sound files, video data, or other data sets to be sent to and/or received from one or more network servers or other devices via one or more wired or wireless networks. The memory 109 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The apparatus 100 can support one or more input devices 112, such as a touchscreen 114, microphone 116, camera 118 and/or physical keys or a keyboard 120 and one or more output devices 122, such as a speaker 124 and a display 126. Other possible output devices (not shown) can include piezoelectric or other haptic output devices. Some devices can serve more than one input/output function. For example, the touchscreen 114 and the display 126 can be combined in a single input/output device. The input devices 112 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 104 or applications 106 can comprise speech-recognition software as part of a voice user interface that allows a user to operate the apparatus 100 via voice commands. Further, the apparatus 100 can comprise input devices and software that allows for user interaction via a user's spatial gestures, such as detecting and interpreting gestures to provide input to a gaming application.

A wireless modem 128 can be coupled to an antenna (not shown) and can support two-way communications between the processor 102 and external devices, as is well understood in the art. The modem 128 is shown generically and can include a cellular modem for communicating with a mobile communication network and/or other radio-based modems (e.g., Bluetooth or Wi-Fi). The wireless modem 128 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, between cellular networks, or between the apparatus and a public switched telephone network (PSTN) etc.

The apparatus 100 can further include at least one input/output port 130, a satellite navigation system receiver 132, such as a Global Positioning System (GPS) receiver, an accelerometer 134, and/or a physical connector 136, which can be a USB port, IEEE 1394 (FireWire) port, and/or RS-232 port. The illustrated components 138 are not required or all-inclusive, as any components can deleted and other components can be added.

Figure 2:
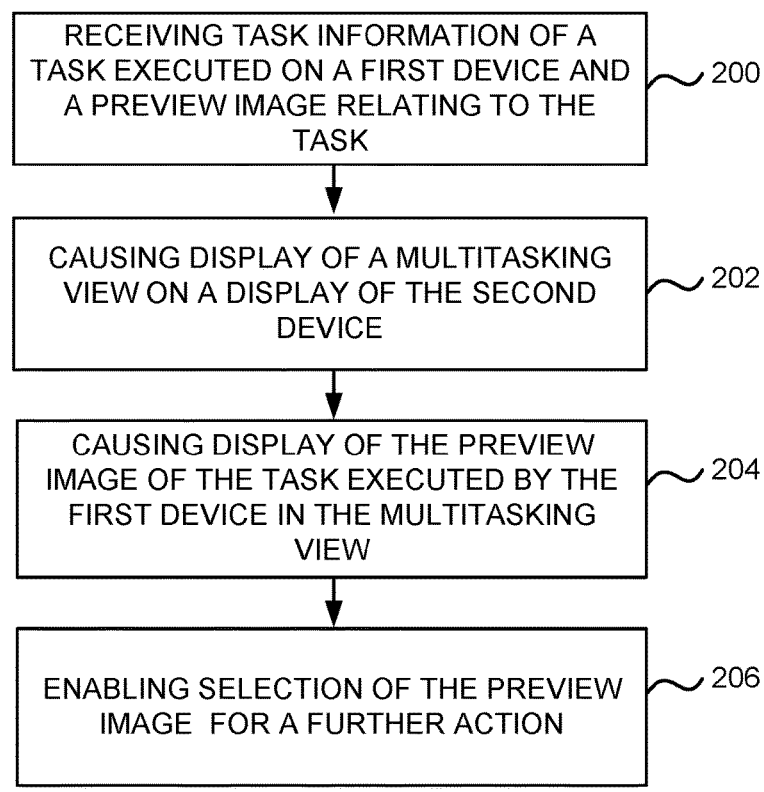
FIG. 2 discloses a flow diagram illustrating a method for enabling an action relating to an application executed in a first device with a multitasking view provided by a second device.

FIG. 2 discloses a flow diagram illustrating a method for enabling an action relating to an application executed in a first device with a multitasking view provided by a second device. As an example, the first device may be a mobile device (for example, a mobile phone or a tablet computer). The second device may be a tablet computer, laptop computer or a personal computer.

In 200 task information of a task executed on a first device and a preview image of the executed task is received by the second device. At least one of at least one processor and at least one memory comprising program code connected to the at least one processor constitute exemplary means for receiving the task information and the preview image. The preview image comprises at least partly a task view on a display of the first device. In one embodiment, the preview image is identical with the task view on the display of the first device. The preview image may be a thumbnail of an application view of the display of the first device. The task information comprises sufficient information that allows the second device to continue the task where it was left off with the first device.

In one embodiment, the second device requests the task information from the first device when a user starts using the second device after stopping using the first device.

In 202 a multitasking view is caused to be displayed on a display of the second device. At least one of at least one processor, at least one memory comprising program code connected to the at least one processor and a display device constitute exemplary means for displaying the multitasking view. The multitasking view comprises applications or tasks currently executed by the second device or applications or tasks that the user can activate with the second device. The applications or tasks may be displayed in the multitasking view as normal application windows with the exception that they are smaller in size. The multitasking view refers to any view provided by an operating system of the second device that is able to display at least some of the currently executed applications or tasks.

In 204 the preview image of the task executed by the first device is caused to be displayed in the multitasking view on the display of the second device. At least one of at least one processor, at least one memory comprising program code connected to the at least one processor and a display device constitute exemplary means for displaying the multitasking view. The multitasking view is extended in such a manner that the user is able to see not only the applications or tasks currently running on the second device, but also applications or tasks that the user has had running on the first device he was using prior to using the second device. When the preview image corresponding to the view on the display of the first device is provided to a user of the second device, the user is able to see the actual window that the user sees when handling the first device.

In 206 selection of the preview image for a further action is enabled. At least one of at least one processor and at least one memory comprising program code connected to the at least one processor constitute exemplary means for displaying the multitasking view. Depending on how the user interacts with the preview image, a different action may be provided.

When the multitasking view provides a thumbnail or thumbnails relating to an application or applications executed on one or more first devices, the user is provided an enhanced user interface experience since the thumbnails look like actual views provided by the one or more first devices. Further, an increased user interaction performance is provided since the preview image provided in the multitasking view results in more efficient user interaction.

Figure 3A:
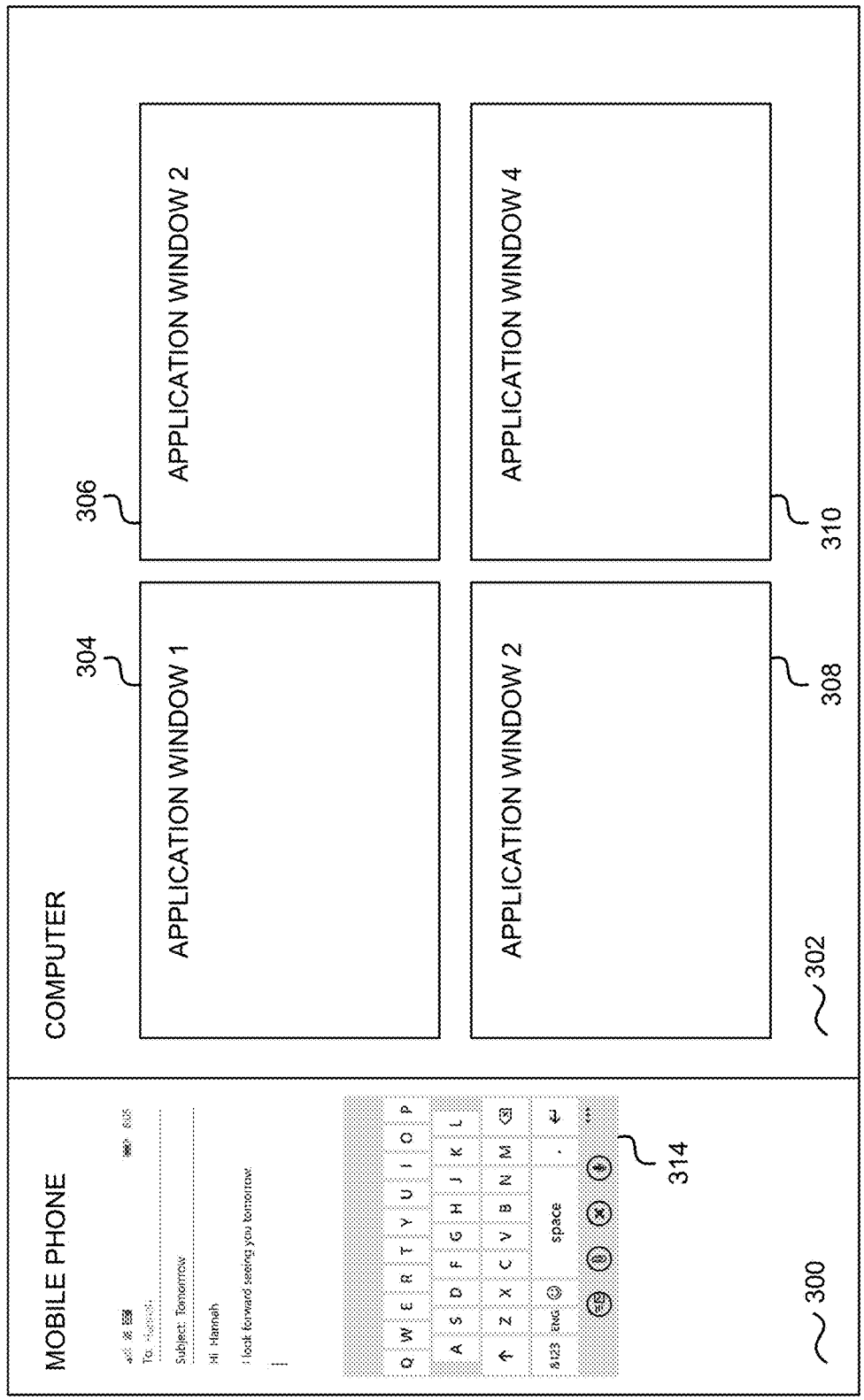
FIG. 3A illustrates a multitasking view provided by the second device.

FIG. 3A illustrates a multitasking view provided by the second device, for example, a computer. The multitasking view is separated into two parts, to a first part 300 that displays a preview image of an application or task executed 314 by a device external to the second device, and to a second part 302 that displays applications or tasks 304-310 executed by the second device. Although the embodiment disclosed in FIG. 3A illustrates only one first device (i.e. a mobile phone) and one application 314 executed by the first device, the first part 300 may display several applications relating to one or more external devices. Further, two or more of the application windows 304-310 may represent application instances of a single application, for example, a user may have multiple word processing documents of a word processing application open that are represented in the second part 302 as separate application windows.

In FIG. 3A, the first part 300 comprises a thumbnail 314 of a draft email written with an email application of the first device. The second device may request task information and the preview image from the first device when a user starts using the second device after stopping using the first device. In the embodiment of FIG. 3A, the task information includes information necessary to continue the task (i.e. writing the email) with an email application of the second device. Thus, when the user launches the multitasking view with the second device, the task information and the preview image are already available at the second device.

Figure 3B:
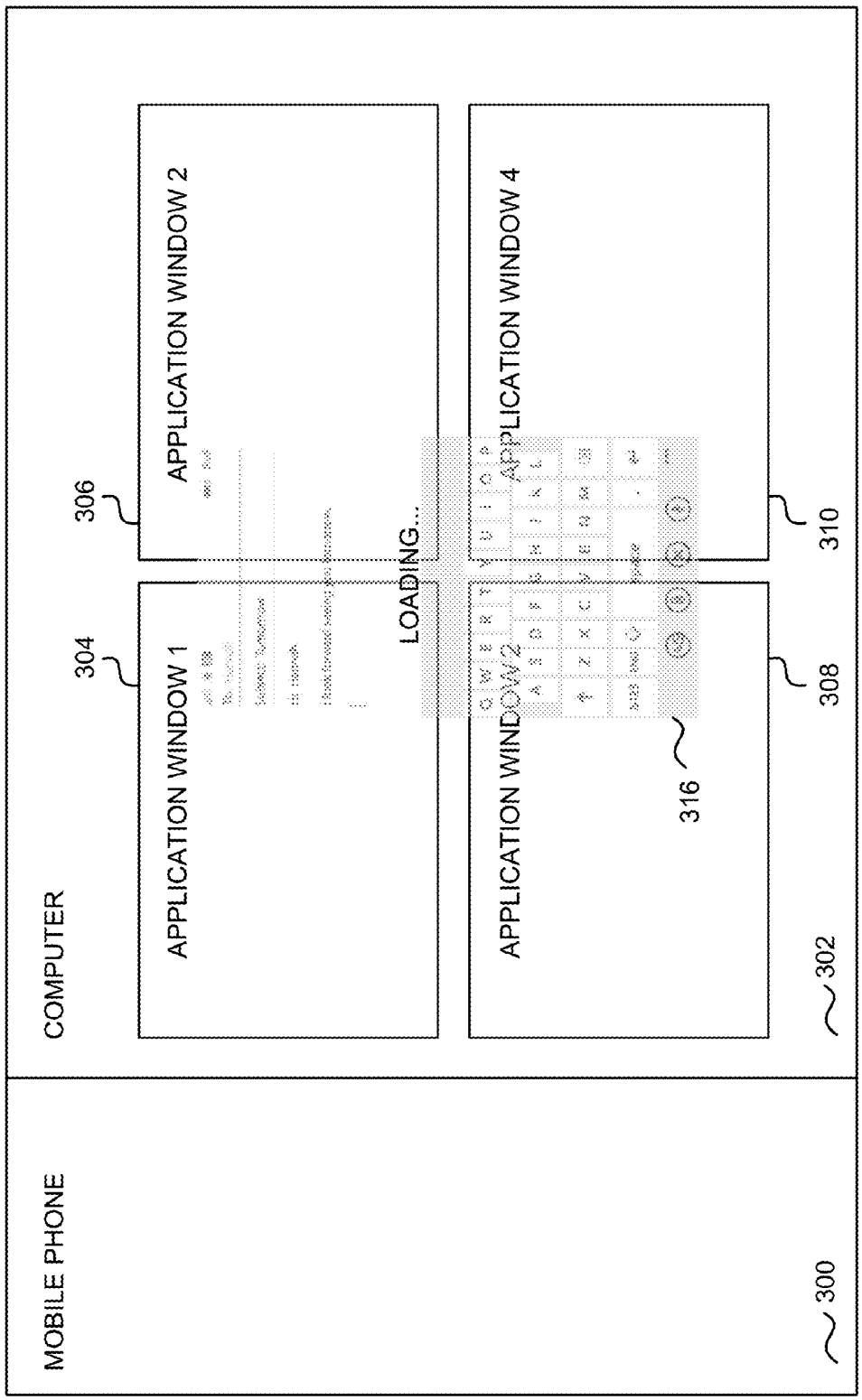
FIG. 3B illustrates another multitasking view provided by the second device.

FIG. 3B illustrates another multitasking view provided by the second device. The view may be provided in response to the user selecting the thumbnail 314. The selection may be made, for example, by tapping the thumbnail 314. In response to the selection, the multitasking view may provide a temporary placeholder image 316 to indicate to the user that the user will shortly be able to resume writing the email with the second device.

Figure 3C:
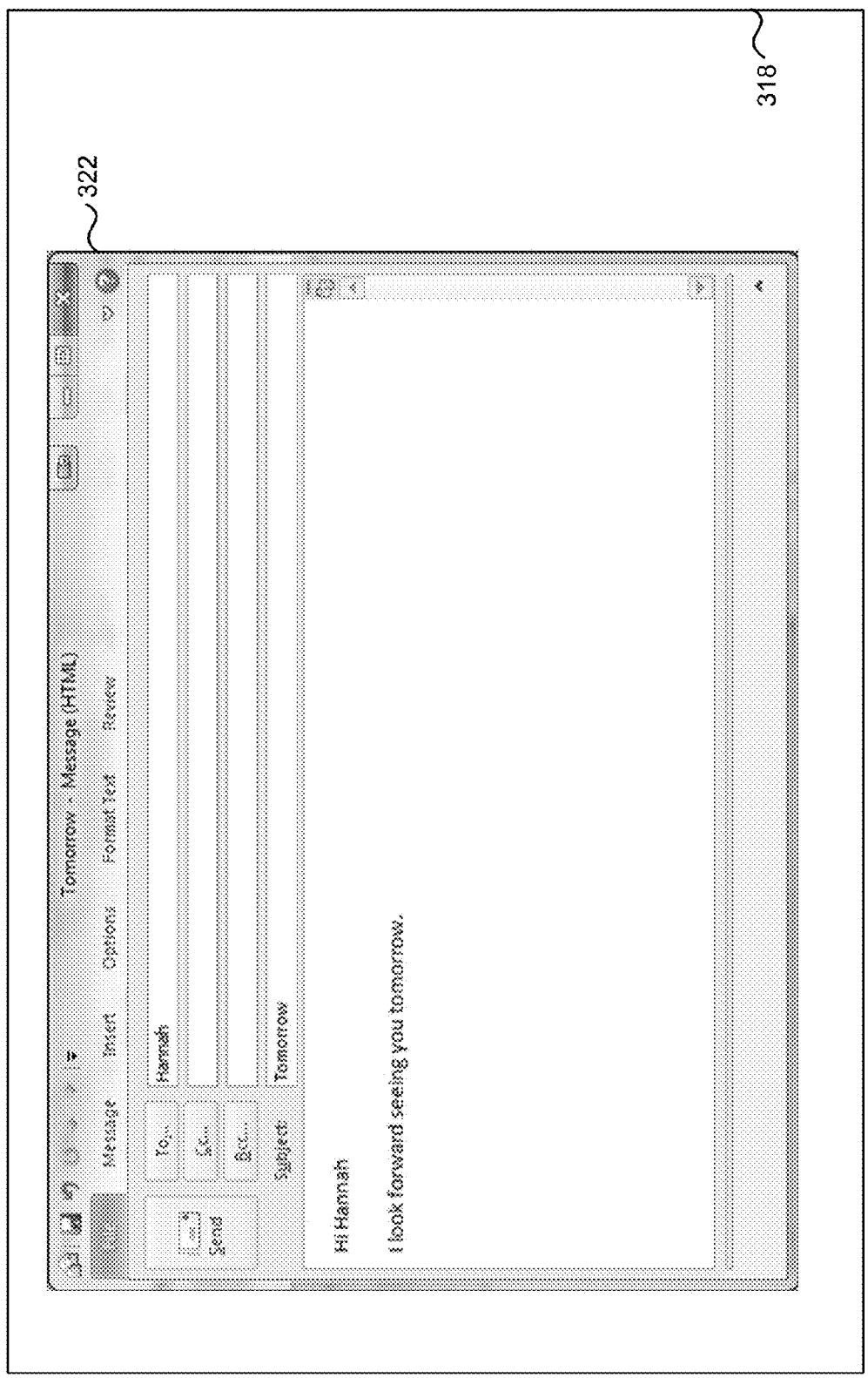
FIG. 3C illustrates a view comprising an email application window provided by the second device.

FIG. 3C illustrates a view 318 comprising an email application window 322 provided by the second device. The email application window 322 may be provided when the email started with the first device can be continued with the email application of the second device.

In one embodiment of FIGS. 3A-3C, the user might have a different application (for example, an email application) installed on the mobile device than in the computer. If the user has a first email application on the mobile device, the user is able to the email with a second email application installed on the computer.

FIGS. 3A-3C illustrate a solution that provides a thumbnail relating to an application executed on the first device that looks like an actual view provided by the first device. Thus the user is able to see from the thumbnail the actual task the user started earlier with the first device. The solution also enables the user to continue with the second device the task started with the first device. Further, an increased user interaction performance is provided since the preview image provided in the multitasking view results in more efficient user interaction.

Figure 4A:
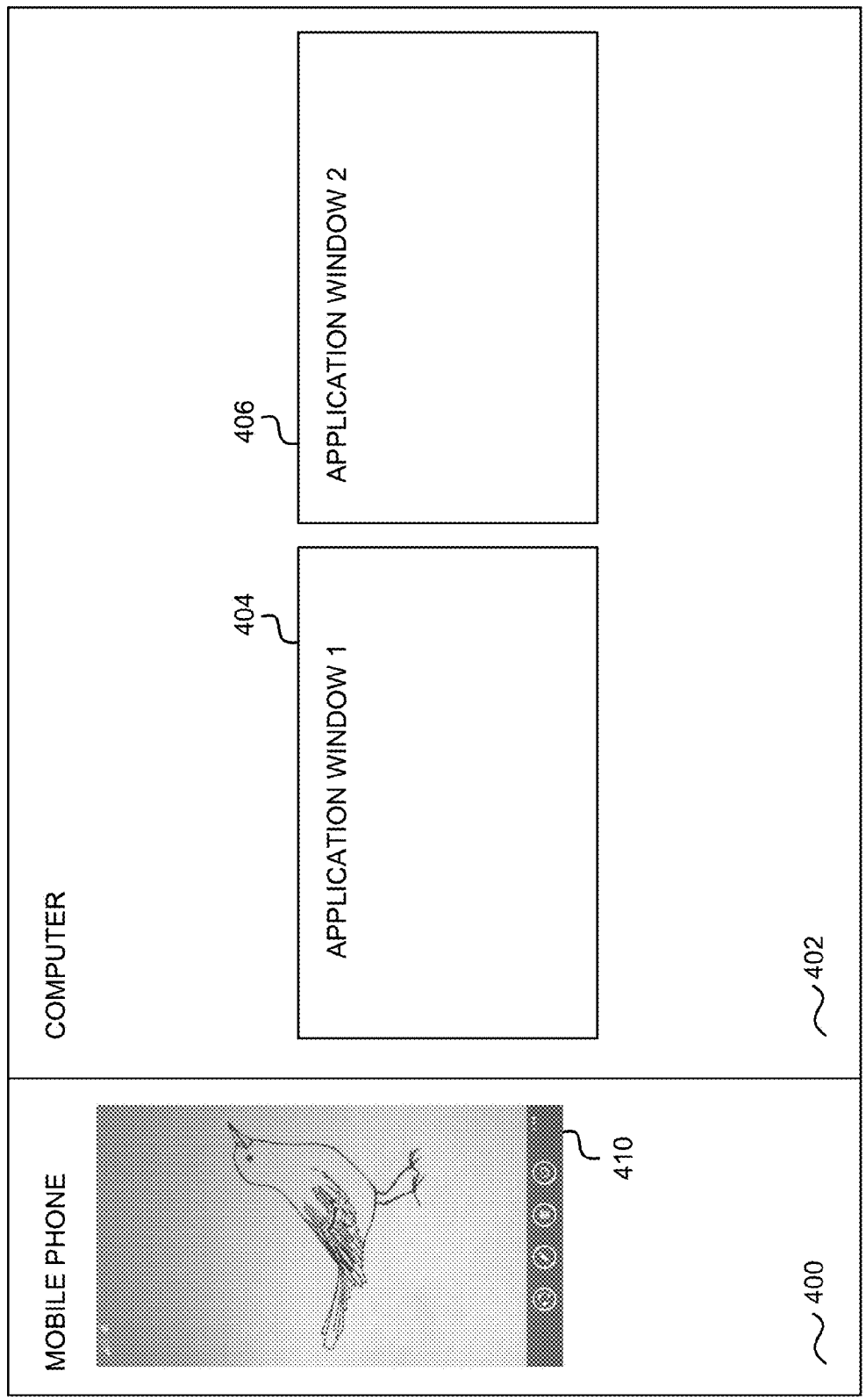
FIG. 4A illustrates a multitasking view provided by the second device.

FIG. 4A illustrates a multitasking view provided by the second device. The multitasking view is separated into two parts, to a first part 400 that displays a preview image of an application or task executed 410 by a device external to the second device, and to a second part 402 that displays applications or tasks 404-406 executed by the second device. Although the embodiment disclosed in FIG. 4A illustrates only one first device and one application 410 executed by the first device, the first part 400 may display several applications relating to one or more external devices.

In FIG. 4A, the first part 400 comprises a thumbnail 410 of a photo viewer application executed by the first device. The second device may request task information and the preview image from the first device when a user starts using the second device after stopping using the first device. The task information may comprise the photo displayed by the photo viewer application of the first device and the preview image of the photo. Thus, when the user launches the multitasking view with the second device, the task information and the preview image are already available at the second device.

FIG. 4B illustrates another multitasking view provided by the second device. After the multitasking view provided in FIG. 4A, in FIG. 4B the user has performed an action linking the preview image to a task in the multitasking view executed by the second device. The action may be a dragging action 416 where the preview image 412 has been dragged onto an application window 404. The dragging action 416 may mean that the user wants to copy the image corresponding to the preview image 410 to the application 404. The application 404 may be a word processing application, a slide show application or any other application to which it is possible to copy the image. When the user is performing the dragging action 416, an information block 414 may be provided to inform what the intended action is. In FIG. 4B, the information block 414 indicates to the user that the image is about to be inserted to an application running in the second device.

Figure 4C:
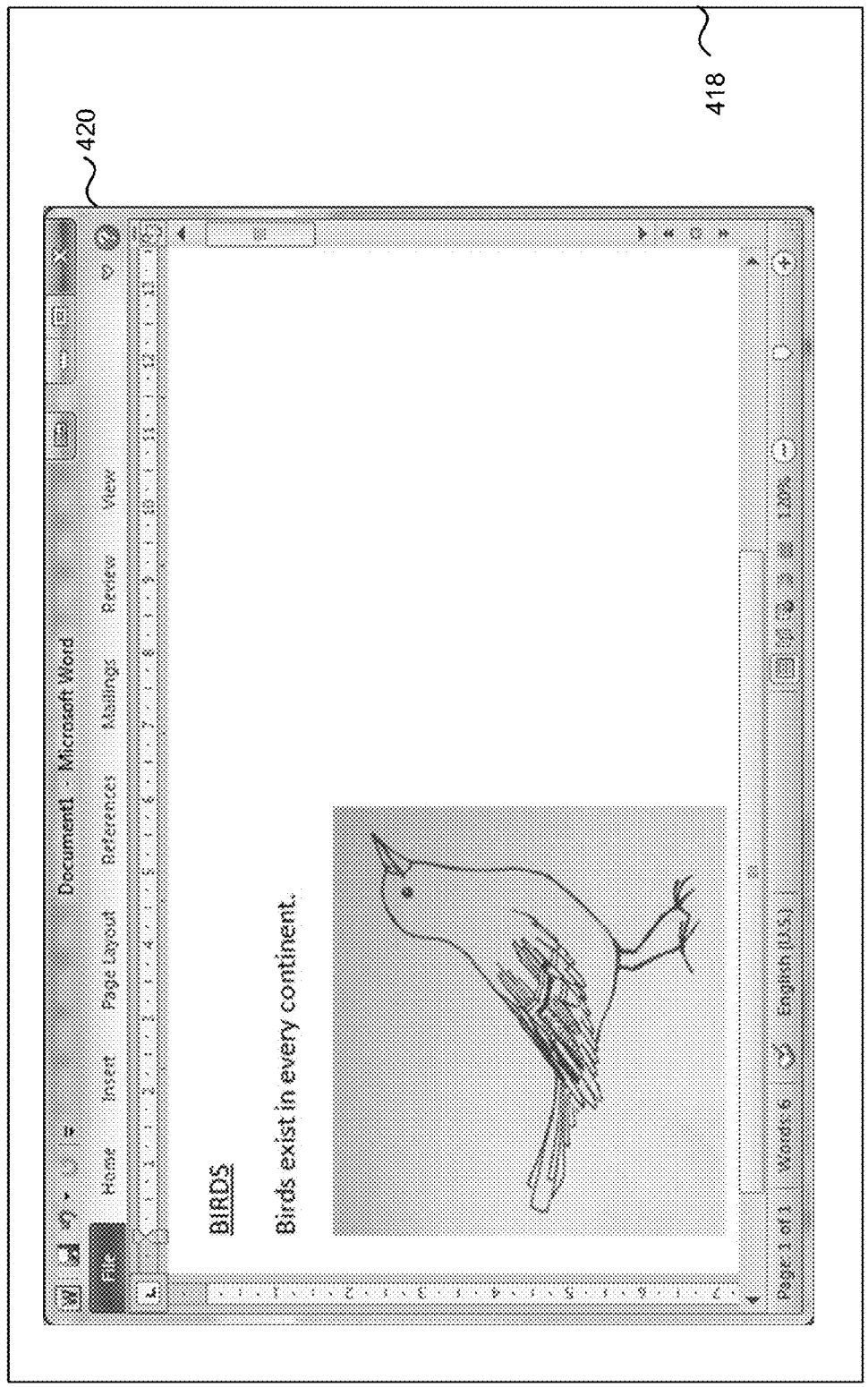
FIG. 4C illustrates another view provided by the second device.

FIG. 4C illustrates another view 416 provided by the second device. The view 416 may be provided when the user dragged the preview image 412 onto the application window 404 as illustrated in FIG. 4B.

In FIG. 4C the application window 404 is a word processing application, and in response to the dragging action, the word processing application is resumed in the second device in an enlarged window 420. The user had previously started to write text relating to birds and wanted to paste an image from his/her mobile device. In response to the dragging action 414 illustrated in FIG. 4B, the image corresponding to the preview image 410 has been copied into a document open in the word processing application.

In one embodiment of FIGS. 4A-4C, the second device determines file content relating to the task information and determines whether the file content relating to the task information is already stored in the second device. For example, the user may have already earlier stored the image corresponding to the preview image 410 on the second device. This may be detected, for example, by an image name, an image identifier or some other identifier identifying that the image is already stored on the second device. Thus, the second device is able to use, the file content already in the second device when executing the action.

In another embodiment of FIGS. 4A-4C, the second device may determine file content relating to the task information and determine whether the file content relating to the task information is available in a network service external to the second device or a device other than the first device and the second device. If the file content is available at the network service external to the second device or the device other than the first device and the second device, the second device may request the file content from the network service or the device and use the file content from the network service or the device when executing the action instead of request the file content from the first device.

In another embodiment of FIGS. 4A-4C it may happen that the second device may not support the file format provided by the first device. In that that case it is possible to perform a file format conversion before executing the action with the application executed by the second device.

FIGS. 4A-4C illustrate a solution where a user is given the possibility to choose the application executed in the second device with which to continue the task started with the first device. Further, as illustrated in FIG. 4B, the user may be able to see from the multitasking view how the task is going to be continued with the application executed by the second device. Further, it may be possible to define different actions for different combinations of applications executed in the first and second devices. For example, if the user browsed a certain web page with the first device, the action performed with the second device may be different depending on the application with which the user decides to continue the task with the second device. For example, if the task is to be continued with a web browser executed by the second device, the same web page may be opened with the web browser of the second device. On the other hand, if the task is to be continued with a word processing application executed by the second device, the link relating to the web page may be copied into a document in the word processing application. Further, an increased user interaction performance is provided since the preview image provided in the multitasking view results in more efficient user interaction. Further, an increased user interaction performance is provided since the user is efficiently able to include content from one application executed in the first device to another application executed in the second device, thus resulting in more efficient user interaction.

Although it has been disclosed that the application with which to continue the task started with the first device is already being executed by the second device, in another embodiment, a new application with which to continue the task may be automatically launched when the user makes the dragging action onto an empty area in the multitasking view. It may also be possible to give the user a possibility to choose which application is to be launched.

Further, it should be noted that although FIGS. 4A-4C have been illustrated using an image file and a word processing application as examples, it is evident that other file format and application combinations are also possible.

Figure 5A:
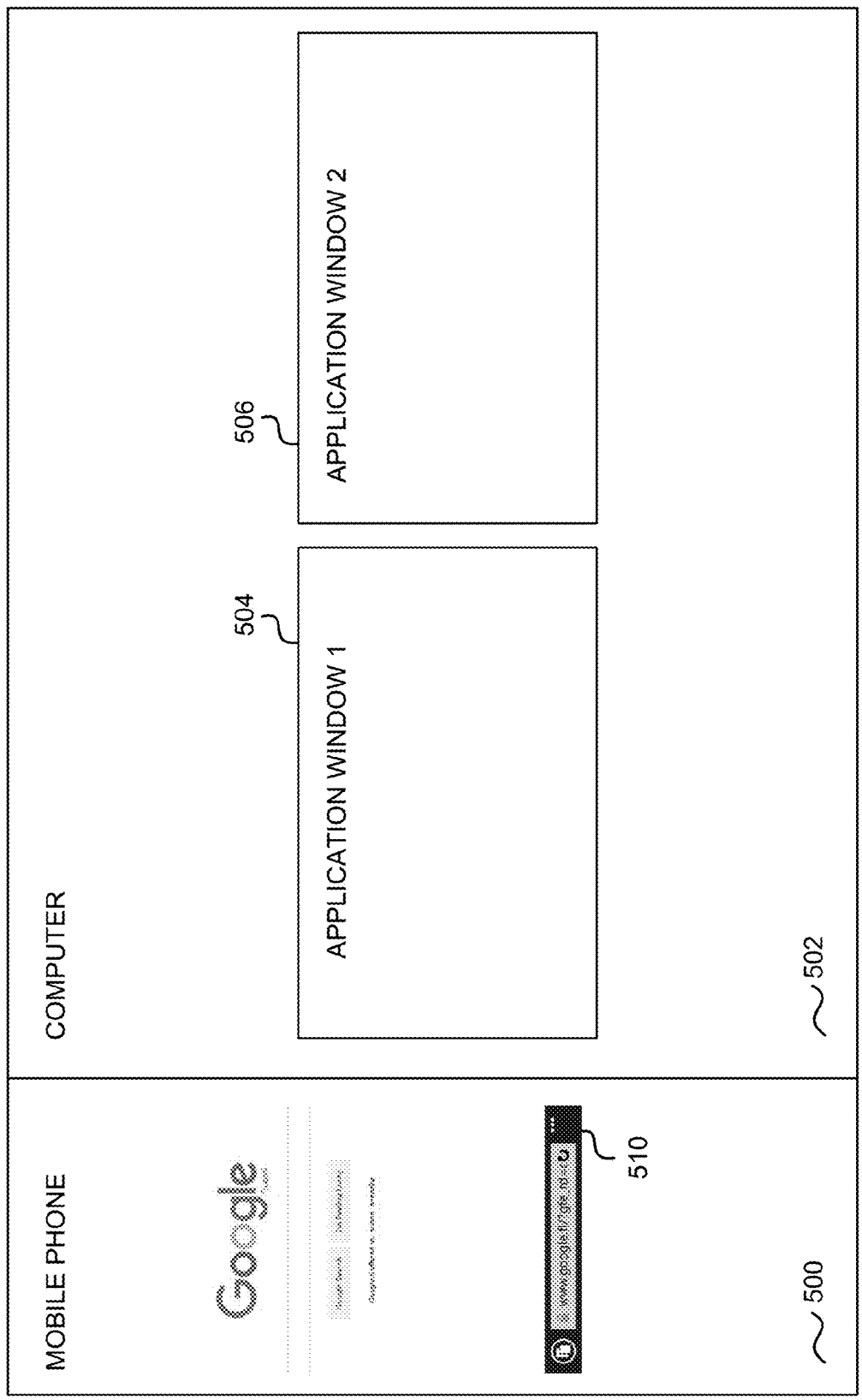
FIG. 5A illustrates a multitasking view provided by the second device.

FIG. 5A illustrates a multitasking view provided by the second device. The multitasking view is separated into two parts, to a first part 500 that displays a preview image of an application or task executed 510 by a device external to the second device, and to a second part 502 that displays applications or tasks 504-506 executed by the second device. Although the embodiment disclosed in FIG. 5A illustrates only one first device and one application 510 executed by the first device, the first part 500 may display several applications relating to one or more external devices.

In FIG. 5A, the first part 500 comprises a thumbnail 510 of a web browser application of a first device. The second device may request task information and the preview image from the first device when a user starts using the second device after stopping using the first device. The task information may comprise the link open in the web browser application, an indication which web browser application is being used and the thumbnail 510 of the web browser application view. Thus, when the user launches the multitasking view with the second device, the task information and the preview image are already available at the second device.

Figure 5B:
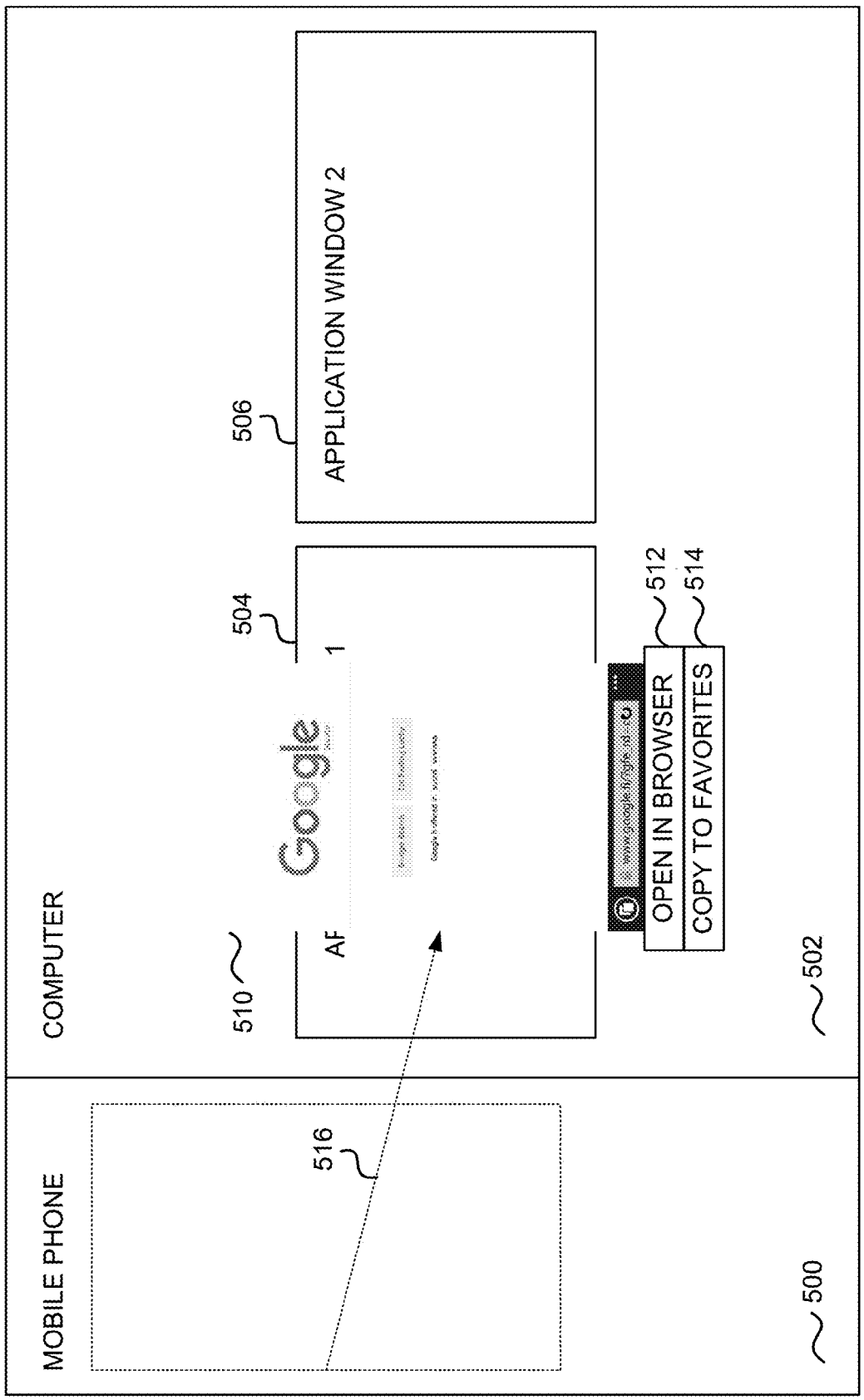
FIG. 5B illustrates another multitasking view provided by the second device.

FIG. 5B illustrates another multitasking view provided by the second device. After the multitasking view provided in FIG. 5A, in FIG. 5B the user has performed an action linking the preview image to a task in the multitasking view executed by the second device. The action may be a dragging action 516 where the preview image 510 has been dragged onto an application window 504. The dragging action 516 may mean that the user wants to perform an action relating to the web page provided by the web browser application. The action to be performed may depend on the application or task executed in the first device and the application onto which the user drags the preview image 510. In FIG. 5B the application window 504 belongs to a web browser application. In one embodiment, when the user drags the preview image 510 onto the application window 504, this provides an indication that the user wishes to open the link with the application 504 of the second device. In one embodiment, an action list 512, 514 may be provided to the user. The action list 512, 514 gives two or more action alternatives for the user to select. In FIG. 5B the user may be provided with the action alternative 512 to open the link in the application 504. Alternatively, the user may choose to copy the link to favorites (the action alternative 514).

FIGS. 5A-5B illustrate a solution where a user is given the possibility to choose the application executed in the second device with which to continue the task started with the first device. Further, as illustrated in FIG. 5B, the user may be given multiple alternatives how the task is going to be continued with the application executed by the second device. Further, it may be possible to define different alternative actions for different combinations of applications executed in the first and second devices. Therefore, a solution may be provided that gives the user several alternative actions how to continue the task with the second device. Further, an increased user interaction performance is provided since the preview image provided in the multitasking view results in more efficient user interaction. Further, an increased user interaction performance is provided since the user is efficiently able to select a desired action to be executed by an application executed in the second device, thus resulting in more efficient user interaction.

Further, although FIGS. 5A-5B illustrate an example using a web page and alternatives how to continue the task with a web browser executed by the second device, it is evident that various other examples and action alternatives may be generated based on the task executed by the first device and the applications executed by the second device.

Figure 6A:
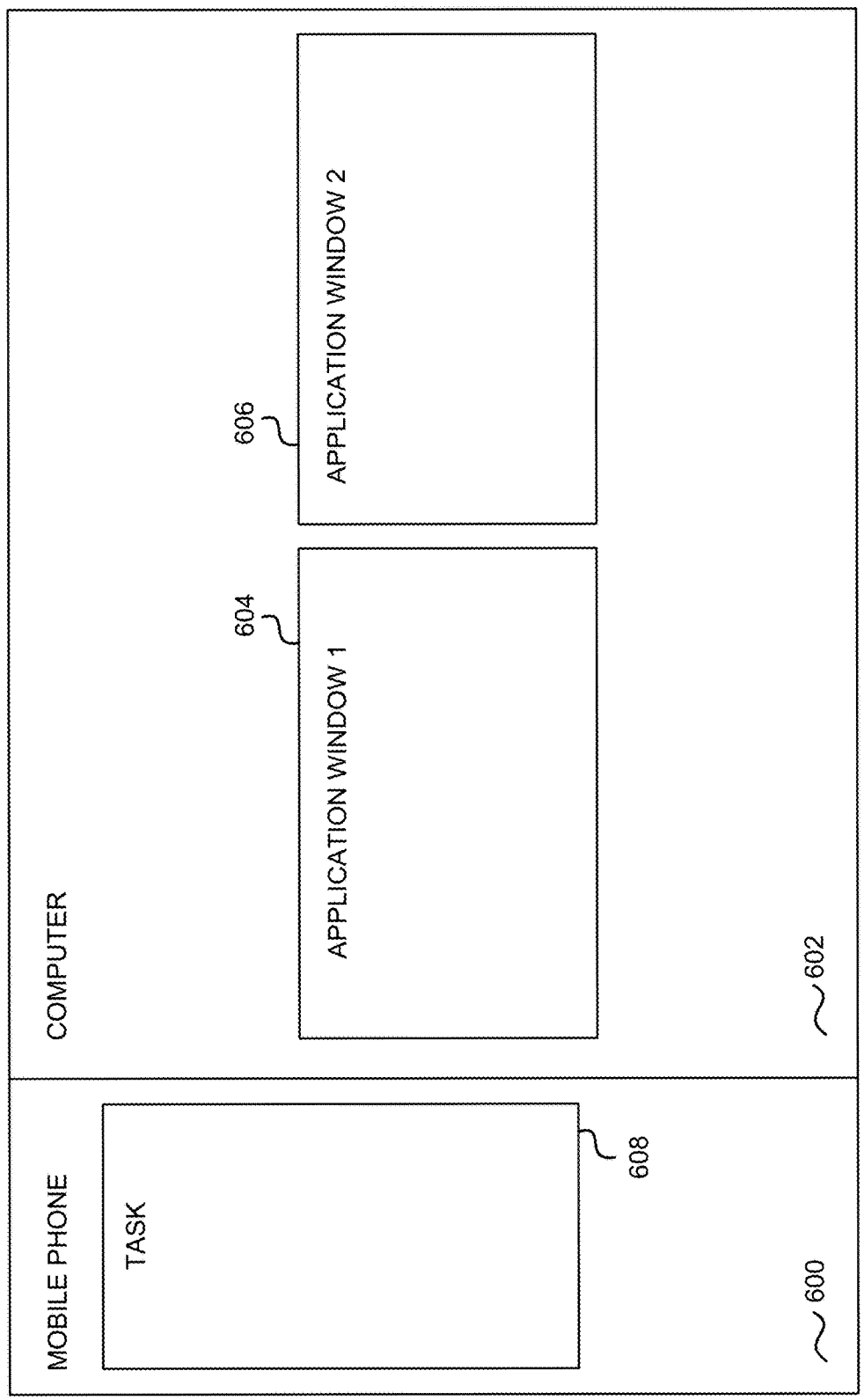
FIG. 6A illustrates a multitasking view provided by the second device.

FIG. 6A illustrates a multitasking view provided by the second device. The multitasking view is separated into two parts, to a first part 600 that displays a preview image of an application or task executed 608 by a device external to the second device, and to a second part 602 that displays applications or tasks 604-606 executed by the second device. Although the embodiment disclosed in FIG. 6A illustrates only one first device and one application 608 executed by the first device, the first part 600 may display several applications relating to one or more external devices.

In FIG. 6A, the first part 600 comprises an icon, a preview image or a thumbnail 608 of a task executed by a first device. The second device may request task information and the preview image from the first device when a user starts using the second device after stopping using the first device. The task information may comprise information about the task so that the task may be continued with an application executed by the second device. When the user launches the multitasking view with the second device, the task information and the preview image may be already available at the second device.

Figure 6B:
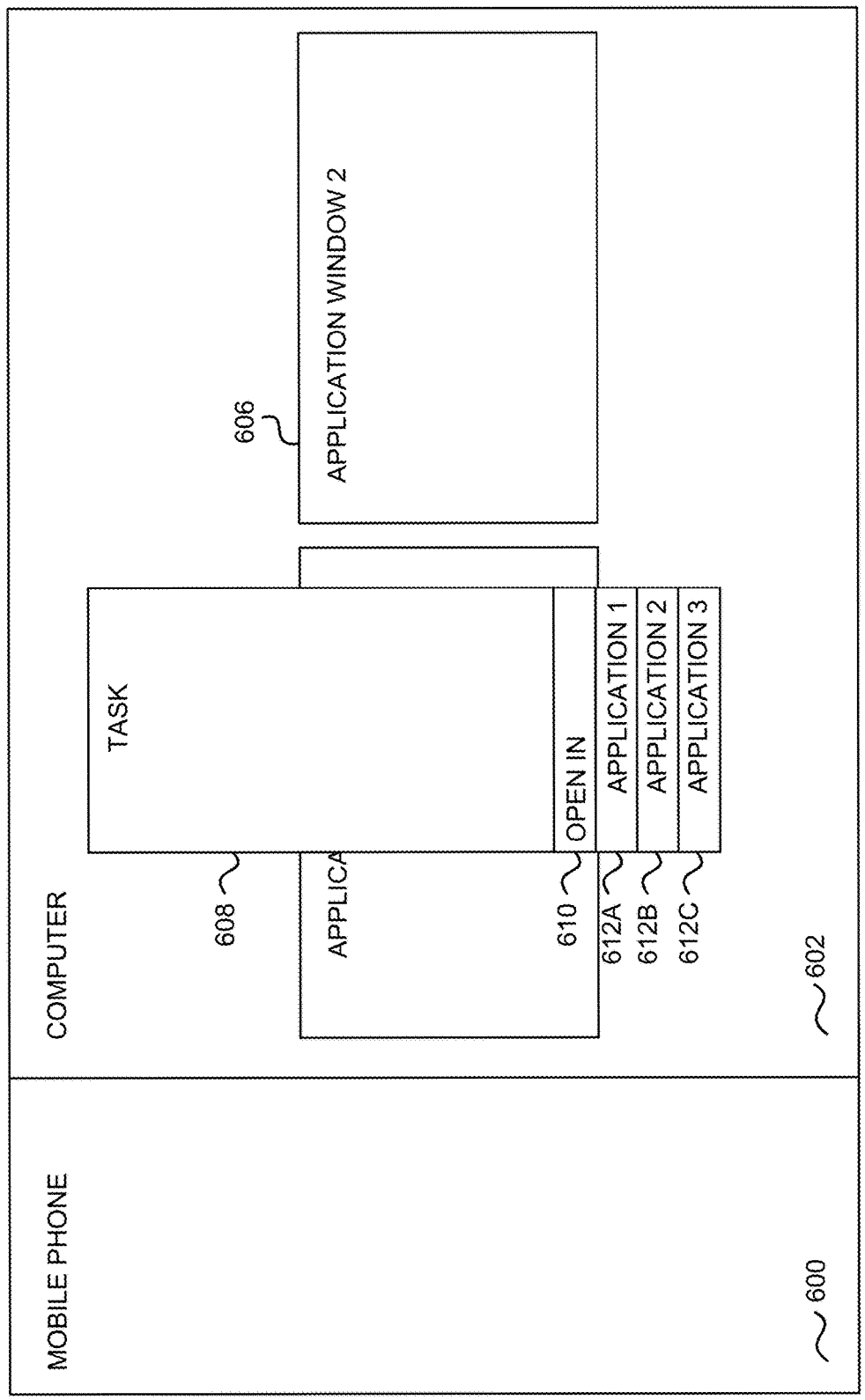
FIG. 6B illustrates another multitasking view provided by the second device.

FIG. 6B illustrates another multitasking view provided by the second device. After the multitasking view provided in FIG. 6A, in FIG. 5B the user has performed an action linking the preview image to a task in the multitasking view executed by the second device. The action may be a dragging action where the preview image 608 has been dragged onto the second part 602. The dragging action indicates that the user wants to continue the task with the second device. As illustrated in FIG. 6B, the user may be provided with an indication 610 indicating to the user with which application 612A-612C the user wishes to continue the task 608. Instead of a dragging action, the user may perform some other action (for example, selection of the task 608) to indicate the wish to continue the task 608 with the second device. The application 612A-612C may comprise at least one application currently being executed by the second device and/or at least one application not executed currently by the second device.

FIGS. 6A-6B illustrate a solution where the user is given a list of applications from which to choose an application with which to continue the task started with the first device. Further, an increased user interaction performance is provided since the user is efficiently able to select an application with which to continue the task started with the first device, thus resulting in more efficient user interaction.

Further, although it has been disclosed that the application with which to continue the task started with the first device is already being executed by the second device, in another embodiment, a new application with which to continue the task may be automatically launched when the user makes the dragging action onto an empty area in the multitasking view.

Further, although FIGS. 3A-3C, 4A-4C, 5A-5B and 6A-6B illustrate a dragging action as an example of an action linking the preview image to a task in the multitasking view executed by the second device, it is evident that also other actions can be used. For example, the user may draw a connecting line between the task executed by the first device and the task executed by the second device. As another example, the user may change the mouse cursor or create a small icon that appears when the user starts the moving gesture and drags that new icon onto the task executed by the second device or on an empty space in the multitasking view.

The examples illustrated and described herein as well as examples not specifically described herein but within the scope of aspects of the disclosure constitute exemplary means for receiving task information of a task executed on a first device and a preview image relating to the executed task, the preview image comprising at least partly a task view on a display of the first device, means for causing display of a multitasking view on a display of a second device, the multitasking view comprising tasks currently executed by the second device, means for causing display of the preview image of the task executed by the first device in the multitasking view on the display of the second device, means for detecting movement of the preview image on a task in the multitasking view executed by the second device, means for determining an action to be executed based on the received task information and the task executed by the second device, and means for executing the action. For example, one or more of the elements illustrated in FIG. 1, constitute exemplary means for receiving task information of a task executed on a first device and a preview image relating to the executed task, the preview image comprising at least partly a task view on a display of the first device, exemplary means for causing display of a multitasking view on a display of a second device, the multitasking view comprising tasks currently executed by the second device, exemplary means for causing display of the preview image of the task executed by the first device in the multitasking view on the display of the second device, exemplary means for detecting movement of the preview image on a task in the multitasking view executed by the second device, exemplary means for determining an action to be executed based on the received task information and the task executed by the second device, and exemplary means for executing the action.

According to an aspect, there is provided a method comprising receiving, by at least one processor, task information of a task executed on a first device and a preview image relating to the executed task, the preview image comprising at least partly a task view on a display of the first device, causing, by the at least one processor, display of a multitasking view on a display of a second device, the multitasking view comprising tasks currently executed by the second device, causing, by the at least one processor, display of the preview image of the task executed by the first device in the multitasking view on the display of the second device, and enabling, by the at least one processor, selection of the preview image to initiate a further action.

In one embodiment, the method further comprises receiving, by the at least one processor, a selection of the preview image from the multitasking view, processing, by the at least one processor, the received task information to determine an application with which to continue the task with the second device, and continuing, by the at least one processor, the task with the application.

In one embodiment, alternatively or in addition, the method further comprises detecting, by the at least one processor, a first action linking the preview image to a task in the multitasking view executed by the second device, determining, by the at least one processor, a second action to be executed based on the received task information and the task executed by the second device, and executing, by the at least one processor, the second action.

In one embodiment, alternatively or in addition, the method further comprises copying content from the task executed by the first device into the task executed by the second device.

In one embodiment, alternatively or in addition, the method further comprises providing, by the at least one processor, an indication of the second action to be executed on the display during the first action of the preview image.

In one embodiment, alternatively or in addition, the method further comprises detecting, by the at least one processor, an action linking the preview image to a task in the multitasking view executed by the second device, and providing, by the at least one processor, an action list of possible second actions when detecting the first action, receiving, by the at least one processor, a selection of a second action in the action list, and executing, by the at least one processor, the selected second action.

In one embodiment, alternatively or in addition, the action list comprises a list of applications with which it is possible to continue the task with the second device, and the method comprises receiving a selection of an application from the action list, and continuing the task with the selected application with the second device.

In one embodiment, alternatively or in addition, the method further comprises performing conversion of the task information before executing the second action with the task executed by the second device.

In one embodiment, alternatively or in addition, the method further comprises determining, by the at least one processor, file content relating to the task information, determining, by the at least one processor, that the file content relating to the task information is already stored in the second device, and using, by the at least one processor, the file content in the second device when executing the second action.

In one embodiment, alternatively or in addition, the method further comprises determining, by the at least one processor, file content relating to the task information, determining, by the at least one processor, that the file content relating to the task information is available in a network service external to the second device or device other than the first device and the second device, requesting, by the at least one processor, the file content from the network service or the device, and using, by the at least one processor, the file content from the network service or the device when executing the second action.

In one embodiment, alternatively or in addition, the method further comprises detecting, by the at least one processor, an action linking the preview image to an empty space in the multitasking view, determining, by the at least one processor, an application to be launched based on the received task information, and launching, by the at least one processor, the application.

In one embodiment, alternatively or in addition, the method further comprises detecting, by the at least one processor, an action linking the preview image to an empty space in the multitasking view, providing, by the at least one processor, in the multitasking view a selection list of applications based on the received task information, receiving, by the at least one processor, selection of an application from the list of applications, and launching, by the at least one processor, the selected application.

According to another aspect, there is provided a method comprising receiving, by at least one processor, task information of a task executed on a first device and a preview image relating to the executed task, the preview image comprising at least partly a task view on a display of the first device, causing, by the at least one processor, display of a multitasking view on a display of a second device, the multitasking view comprising tasks currently executed by the second device, causing, by the at least one processor, display of the preview image of the task executed by the first device in the multitasking view on the display of the second device, detecting, by the at least one processor, movement of the preview image on a task in the multitasking view executed by the second device, determining, by the at least one processor, an action to be executed based on the received task information and the task executed by the second device, and executing, by the at least one processor, the action.

In one embodiment, the method further comprises copying, by the at least one processor, content from the task executed by the first device into the task executed by the second device.

In one embodiment, alternatively or in addition, the method further comprises providing, by the at least one processor, an indication of the action to be executed on the display during the movement of the preview image.

In one embodiment, alternatively or in addition, the method further comprises providing, by the at least one processor, an action list of possible actions when detecting the movement of the preview image, receiving, by the at least one processor, a selection of an action in the action list, and executing, by the at least one processor, the action.

In one embodiment, alternatively or in addition, the method further comprises performing, by the at least one processor, conversion of the task information before executing the second action with the task executed by the second device.

In one embodiment, alternatively or in addition, the method further comprises determining, by the at least one processor, file content relating to the task information, determining, by the at least one processor, that the file content relating to the task information is available in a network service external to the second device or device other than the first device and the second device, requesting, by the at least one processor, the file content from the network service or the device, and using, by the at least one processor, the file content from the network service or the device when executing the second action.

In one embodiment, alternatively or in addition, the method further comprises determining, by the at least one processor, file content relating to the task information, determining, by the at least one processor, that the file content relating to the task information is already stored in the second device, and using, by the at least one processor, the file content in the second device when executing the second action.

According to another aspect, there is provided an apparatus comprising at least one processing unit and at least one memory. The at least one memory stores program instructions that, when executed by the at least one processing unit, cause the apparatus to receive task information of a task executed on a first device and a preview image relating to the executed task, the preview image comprising at least partly an application view on a display of the first device, cause display of a multitasking view on a display of a second device, the multitasking view comprising tasks currently executed by the second device, cause display of the preview image of the task executed by the first device in the multitasking view on the display of the second device, and enable selection of the preview image to initiate a further action.

In one embodiment, the at least one memory stores program instructions that, when executed by the at least one processing unit, cause the apparatus to receive a selection of the preview image from the multitasking view, process the received task information to determine an application with which to continue the task with the second device, and continue the task with the application.

In one embodiment, alternatively or in addition, the at least one memory stores program instructions that, when executed by the at least one processing unit, cause the apparatus to detect a first action linking the preview image to a task in the multitasking view executed by the second device, determine a second action to be executed based on the received task information and the task executed by the second device, and execute the second action.

In one embodiment, alternatively or in addition, the at least one memory stores program instructions that, when executed by the at least one processing unit, cause the apparatus to copy content from the task executed by the first device into the task executed by the second device.

In one embodiment, alternatively or in addition, the at least one memory stores program instructions that, when executed by the at least one processing unit, cause the apparatus to provide an indication of the second action to be executed on the display during the first action of the preview image.

In one embodiment, alternatively or in addition, the at least one memory stores program instructions that, when executed by the at least one processing unit, cause the apparatus to detect an action linking the preview image to a task in the multitasking view executed by the second device, provide an action list of possible second actions when detecting the first action, receive a selection of a second action in the action list, and execute the selected second action.

In one embodiment, alternatively or in addition the action list comprises a list of applications with which it is possible to continue the task with the second device, wherein the at least one memory stores program instructions that, when executed by the at least one processing unit, cause the apparatus to receive a selection of an application from the action list, and continue the task with the selected application with the second device.

In one embodiment, alternatively or in addition, the at least one memory stores program instructions that, when executed by the at least one processing unit, cause the apparatus to perform conversion of the task information before executing the second action with the task executed by the second device.

In one embodiment, alternatively or in addition, the at least one memory stores program instructions that, when executed by the at least one processing unit, cause the apparatus to determine file content relating to the task information, determine that the file content relating to the task information is already stored in the second device, and use the file content in the second device when executing the second action.

In one embodiment, alternatively or in addition, the at least one memory stores program instructions that, when executed by the at least one processing unit, cause the apparatus to determine file content relating to the task information, determine that the file content relating to the task information is available in a network service external to the second device or device other than the first device and the second device, request the file content from the network service or the device and use the file content from the network service or the device when executing the second action.

In one embodiment, alternatively or in addition, the at least one memory stores program instructions that, when executed by the at least one processing unit, cause the apparatus to detect an action linking the preview image to an empty space in the multitasking view, determine an application to be launched based on the received task information, and launch the application.

In one embodiment, alternatively or in addition, the at least one memory stores program instructions that, when executed by the at least one processing unit, cause the apparatus to detect an action linking the preview image to an empty space in the multitasking view, provide in the multitasking view a selection list of applications based on the received task information, receive selection of an application from the list of applications, and launch the selected application.

According to another aspect, there is provided an apparatus comprising at least one processing unit, and at least one memory. The at least one memory stores program instructions that, when executed by the at least one processing unit, cause the apparatus to receive task information of a task executed by a first device and a preview image relating to the task, the preview image comprising at least partly a task view on a display of the first device, cause display of a multitasking view on a display of a second device, the multitasking view comprising tasks currently executed by the second device, cause display of the preview image of the task executed by the first device in the multitasking view on the display of the second device, detect an action linking the preview image to a task in the multitasking view executed by the second device, and copy content from the task executed by the first device into the task executed by the second device.

According to another aspect, there is provided an apparatus comprising means for receiving task information of a task executed by a first device and a preview image relating to the task, the preview image comprising at least partly a task view on a display of the first device, means for causing display of a multitasking view on a display of a second device, the multitasking view comprising tasks currently executed by the second device, means for causing display of the preview image of the task executed by the first device in the multitasking view on the display of the second device, means for detecting an action linking the preview image to a task in the multitasking view executed by the second device, and means for copying content from the task executed by the first device into the task executed by the second device.

According to another aspect, there is provided an apparatus comprising means for receiving task information of a task executed on a first device and a preview image of the executed task, the preview image comprising at least partly an application view on a display of the first device, means for causing display of a multitasking view on a display of a second device, the multitasking view comprising tasks currently executed by the second device, means for causing display of the preview image of the task executed by the first device in the multitasking view on the display of the second device, and means for enabling selection of the preview image to initiate a further action. The means may be implemented, for example, by at least one processor or at least one processor and at least one memory connected to the at least one processor.

According to another aspect, there is provided a method comprising receiving, by at least one processor, task information of a task executed by a first device and a preview image relating to the task, the preview image comprising at least partly a task view on a display of the first device, causing, by the at least one processor, display of a multitasking view on a display of a second device, the multitasking view comprising tasks currently executed by the second device, causing, by the at least one processor, display of the preview image of the task executed by the first device in the multitasking view on the display of the second device, detecting, by the at least one processor, an action linking the preview image to a task in the multitasking view executed by the second device, and copying, by the at least one processor, content from the task executed by the first device into the task executed by the second device.

According to another aspect, there is provided a computer program comprising program code, which when executed by at least one processor, causes an apparatus to perform receiving task information of a task executed on a first device and a preview image of the executed task, the preview image comprising at least partly a task view on a display of the first device, causing display of a multitasking view on a display of a second device, the multitasking view comprising tasks currently executed by the second device, causing display of the preview image of the task executed by the first device in the multitasking view on the display of the second device, and enabling selection of the preview image to initiate a further action.

In one embodiment, the computer program is embodied on a computer-readable medium or on a non-transitory computer-readable medium.

According to another aspect, there is provided a computer program comprising program code, which when executed by at least one processor, causes an apparatus to perform receiving, by at least one processor, task information of a task executed on a first device and a preview image relating to the executed task, the preview image comprising at least partly a task view on a display of the first device, causing, by the at least one processor, display of a multitasking view on a display of a second device, the multitasking view comprising tasks currently executed by the second device, causing, by the at least one processor, display of the preview image of the task executed by the first device in the multitasking view on the display of the second device, detecting, by the at least one processor, movement of the preview image on a task in the multitasking view executed by the second device, determining, by the at least one processor, an action to be executed based on the received task information and the task executed by the second device, and executing, by the at least one processor, the action In one embodiment, the computer program is embodied on a computer-readable medium or on a non-transitory computer-readable medium.

According to another aspect, there is provided a computer program comprising program code, which when executed by at least one processor, causes an apparatus to perform receiving, by at least one processor, task information of a task executed by a first device and a preview image relating to the task, the preview image comprising at least partly a task view on a display of the first device, causing, by the at least one processor, display of a multitasking view on a display of a second device, the multitasking view comprising tasks currently executed by the second device, causing, by the at least one processor, display of the preview image of the task executed by the first device in the multitasking view on the display of the second device, detecting, by the at least one processor, an action linking the preview image to a task in the multitasking view executed by the second device, and copying, by the at least one processor, content from the task executed by the first device into the task executed by the second device.

In one embodiment, the computer program is embodied on a computer-readable medium or on a non-transitory computer-readable medium.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. An apparatus, comprising:
   at least one processing unit; and
   at least one memory;
   wherein the at least one memory stores program instructions that, when executed by the at least one processing unit, cause the apparatus to:
   detect a user has started using a second device after stopping using a first device on which a task is being executed;
   incident to said detection that the user has started using the second device, direct the second device to request, from the first device, task information and a preview image relating to the task being executed on the first device;
   receive the task information and the preview image relating to the task being executed on the first device;
   cause display of a multitasking view on a display of the second device, the multitasking view comprising tasks currently executed by the second device;
   cause display of the preview image of the task being executed on the first device in the multitasking view on the display of the second device;
   enable selection of the preview image on the second device to initiate a further action; and
   incident to said election of the preview image on the second device, continuing execution of the task on the second device.

2. An apparatus according to claim 1, wherein the at least one memory stores program instructions that, when executed by the at least one processing unit, cause the apparatus to:
   receive a selection of the preview image from the multitasking view;
   process the received task information to determine an application with which to continue the task with the second device; and
   continue the task with the application.

3. An apparatus according to claim 1, wherein the at least one memory stores program instructions that, when executed by the at least one processing unit, cause the apparatus to:
   detect a first action linking the preview image to a task in the multitasking view executed by the second device;
   determine a second action to be executed based on the received task information and the task executed by the second device; and
   execute the second action.

4. An apparatus according to claim 3, wherein the at least one memory stores program instructions that, when executed by the at least one processing unit, cause the apparatus to:
   copy content from the task executed by the first device into the task executed by the second device.

5. An apparatus according to claim 3, wherein the at least one memory stores program instructions that, when executed by the at least one processing unit, cause the apparatus to:
   provide an indication of the second action to be executed on the display during the first action of the preview image.

6. An apparatus according to claim 3, wherein the at least one memory stores program instructions that, when executed by the at least one processing unit, cause the apparatus to:
   perform conversion of the task information before executing the second action with the task executed by the second device.

7. An apparatus according to claim 3, wherein the at least one memory stores program instructions that, when executed by the at least one processing unit, cause the apparatus to:
   determine file content relating to the task information;
   determine that the file content relating to the task information is already stored in the second device; and
   use the file content in the second device when executing the second action.

8. An apparatus according to claim 3, wherein the at least one memory stores program instructions that, when executed by the at least one processing unit, cause the apparatus to:
   determine file content relating to the task information;
   determine that the file content relating to the task information is available in a network service external to the second device or device other than the first device and the second device;
   request the file content from the network service or the device; and
   use the file content from the network service or the device when executing the second action.

9. An apparatus according to claim 1, wherein the at least one memory stores program instructions that, when executed by the at least one processing unit, cause the apparatus to:
   detect an action linking the preview image to a task in the multitasking view executed by the second device; and
   provide an action list of possible second actions when detecting the first action;
   receive a selection of a second action in the action list; and
   execute the selected second action.

10. An apparatus according to claim 9, wherein the action list comprises a list of applications with which it is possible to continue the task with the second device, wherein the at least one memory stores program instructions that, when executed by the at least one processing unit, cause the apparatus to:
    receive a selection of an application from the action list; and
    continue the task with the selected application with the second device.

11. An apparatus according to claim 1, wherein the at least one memory stores program instructions that, when executed by the at least one processing unit, cause the apparatus to:

detect an action linking the preview image to an empty space in the multitasking view;
determine an application to be launched based on the received task information; and
launch, by the at least one processor, the application.

12. An apparatus according to claim 1, wherein the at least one memory stores program instructions that, when executed by the at least one processing unit, cause the apparatus to:
detect an action linking the preview image to an empty space in the multitasking view;
provide, in the multitasking view a selection list of applications based on the received task information;
receive selection of an application from the list of applications; and
launch the selected application.

13. A method comprising:
detecting, by at least one processor, a user has started using a second device after stopping using a first device on which a task is being executed;
incident to said detection that the user has started using the second device, directing, by the at least one processor, the second device to request, from the first device, task information and a preview image relating to the task being executed on the first device;
receiving, by the at least one processor, the task information and the preview image relating to the task being executed on the first device;
causing, by the at least one processor, display of a multitasking view on a display of the second device, the multitasking view comprising tasks currently executed by the second device; and
causing, by the at least one processor, display of the preview image of the task being executed on the first device in the multitasking view on the display of the second device.

14. A method according to claim 13, further comprising:
detecting, by the at least one processor, election of the preview image in the multitasking view executed on the second device;
incident to said election of the preview image on the second device, causing, by the at least one processor, display of a second application specific to the second device and different from a first application executing the task in the first application specific to the first device;
determining, by the at least one processor, an action in the second application related to the task to be executed in the second application based on the received task information; and
executing, by the at least one processor, the action.

15. A method according to claim 13, further comprising:
providing, by the at least one processor, an indication of the action to be executed on the display during the movement of the preview image.

16. A method according to claim 13, further comprising:
providing, by the at least one processor, an action list of possible actions when detecting the movement of the preview image;
receiving, by the at least one processor, a selection of an action in the action list; and
executing, by the at least one processor, the action.

17. A method according to claim 13, further comprising:
performing, by the at least one processor, conversion of the task information before executing the action with the task executed by the second device.

18. A method according to claim 13, further comprising:
determining, by the at least one processor, file content relating to the task information;
determining, by the at least one processor, that the file content relating to the task information is available in a network service external to the second device or device other than the first device and the second device;
requesting, by the at least one processor, the file content from the network service or the device; and
using, by the at least one processor, the file content from the network service or the device when executing the action.

19. A method according to claim 13, further comprising:
determining, by the at least one processor, file content relating to the task information;
determining, by the at least one processor, that the file content relating to the task information is already stored in the second device; and
using, by the at least one processor, the file content in the second device when executing the action.

20. An apparatus, comprising:
at least one processing unit; and
at least one memory;
wherein the at least one memory stores program instructions that, when executed by the at least one processing unit, cause the apparatus to:
detect a user has started using a second device after stopping using a first device on which a task is being executed;
incident to said detection that the user has started using the second device, direct the second device to request, from the first device, task information and a preview image relating to the task being executed on the first device;
receive the task information and the preview image relating to the task being executed on the first device;
cause display of a multitasking view on a display of the second device, the multitasking view comprising tasks currently executed by the second device;
cause display of the preview image of the task being executed on the first device in the multitasking view on the display of the second device;
detect an action linking the preview image to a task in the multitasking view executed by the second device; and
copy content from the task executed by the first device into a second application specific to the second device for continuing the task on the second device, wherein the first application is a different application than the second application.

* * * * *